June 23, 1959 R. BROWNLEE, JR 2,891,322
PERIODIC TABLE TEACHING DEVICE
Filed Jan. 11, 1957
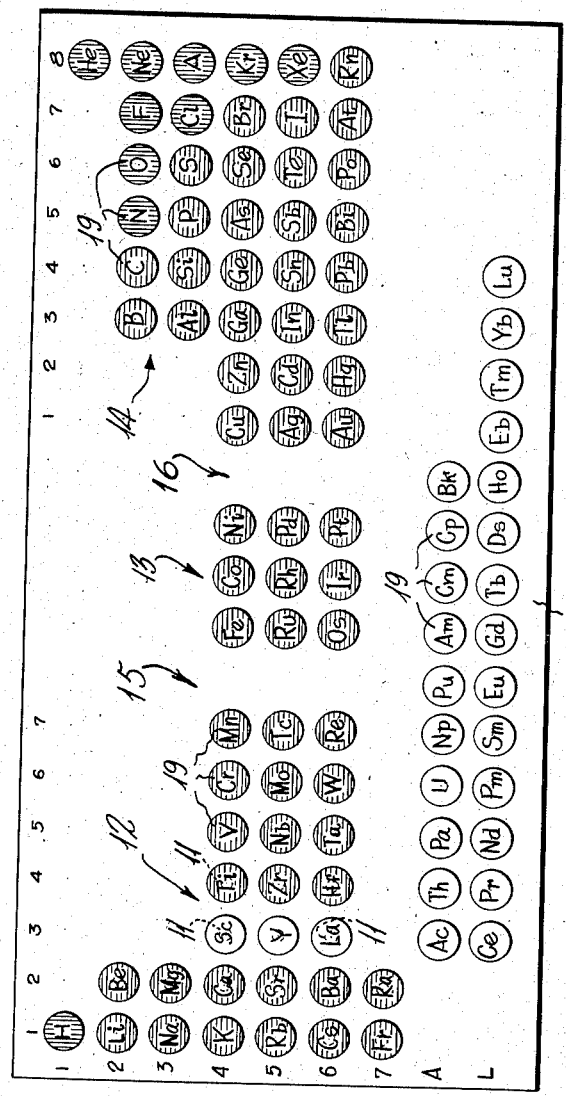
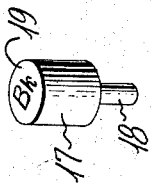
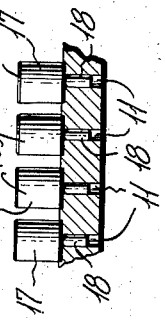
INVENTOR
Russell Brownlee, Jr.
BY Mason, Fenwick & Lawrence
ATTORNEYS

# United States Patent Office 2,891,322
Patented June 23, 1959

2,891,322
PERIODIC TABLE TEACHING DEVICE

Russell Brownlee, Jr., Williamsport, Pa.; Martha A. Brownlee, administratrix of said Russell Brownlee, Jr., deceased Application January 11, 1957, Serial No. 633,779

1 Claim. (Cl. 35—18)

This invention relates to an educational device designed as a means of aiding both the teacher and pupil, to familiarize the latter with the periodic system of classification of the elements, and to provide a simple basis for the study of periodic chemistry.

The principal object of the device, which from its function may be designated an element instructor, is to provide a training aid that will develop skill in the acquiring of knowledge of the significance of the progression of atomic numbers or atomic weights, and awareness of the periodic positions that form the two divisions of periodic chemistry.

Another object of the invention is to provide a mechanical embodiment of the periodic chart or table, which is an improvement of the conventional chart in printed sheet form, in that by reason of its three-dimensional character and the manipulatability of its parts, its furnishes an aid to the teacher in translating a difficult subject, and mnemonic assistance to the student in learning the positions of the elements in the table and the implications deriving from their relative positions, of property, family relationship, etc.

More specifically stated, it is an object of the invention to provide an element instructor in the form of a highly developed pegboard, in which the elements are represented by removable pegs, each bearing the symbol designation of the element that it represents, and the group and period positions being determined by intersecting rows and columns perpendicularly related, the element arrangement in this three-dimensional manipulatable "chart" being modified with respect to that of conventional periodic charts or tables, in that the iron-platinum triads have been removed from their conventional positions in group 8, and placed between the a and b elements in the respective periods, in order to better demonstrate their bridge relationship to the a and b groups.

Other objects of the invention will appear as the following description of a practical embodiment thereof proceeds.

In the drawing which accompanies and forms a part of the following specification:

Figure 1 is a plan view of the element instructor with the pegs in place, illustrating the novel pattern of arrangement of the groups;

Figure 2 is a fragmentary sectional view;

Figure 3 is a perspective view of one of the pegs.

Referring now in detail to the drawing, the numeral 10 represents a pegboard provided with a pattern of holes 11, in which the holes as shown, are arranged in rows and columns both vertically and horizontally aligned. The holes are divided into three blocks, 12, 13, and 14, the left-hand block 12 establishing the positions for the pegs of the a elements exclusive of the iron-platinum group, the right-hand block 14 being for the pegs representing the b elements of all the groups, and the middle block 13 being for the pegs of the iron-platinum group of elements. The three blocks are demarked by intervening wide unperforated spaces 15 and 16.

At the head of each vertical column in the left-hand block, the numerals 1 to 7, inclusive, are printed on the pegboard, indicating the series of groups of the a elements, and these same numbers are also printed above the vertical columns of the right-hand block, indicating the b elements of the same groups, with the addition of the numeral 8, designating the last group of b units. The middle block could be designated by the numeral 8, since the iron-platnium triads are the a members of group 8, transferred, but as the middle block is set off from the other blocks by the wide spacing, and the student knows that the elements occupying said block have been merely positionally transferred from their a position in conventional group 8, this marking is regarded as unnecessary.

The horizintal rows of pegs extending across the blocks 12, 13 and 14 represent the periods, which are designated by numerals 1 to 7, inclusive, printed on the pegboard in front of each row. Beneath the blocks 12, 13 and 14 are two horizontal rows of holes which have no reference to the group headings at the top of the pegboard. These rows are respectively for the pegs representing the actinide and the lanthanide earths, the former having been dropped from the conventional position as members of period 7, and placed with the lanthanide earths so that their behavior as rare earths will be stressed. These rows are respectively designated by the letters A and L printed on the pegboard.

Figures 2 and 3 show that the pegs consist of a knob portion 17, convenient to holes when manipulating the instructor, and a reduced shank portion 18 frictionally fitting the holes in the pegboard. The tops 19 of the pegs are preferably flat, each bearing the symbol of a different one of the elements. The tops of the pegs may be differently colored to distinguish between elements that are gases, earths, and solids other than earths.

In the above described element instructor, the pegs are arranged in the order of increasing progression of the atomic numbers of the elements, rather than according to their atomic weights, thereby avoiding several exceptions to the law of periodic progression.

As an example of the manner in which the element instructor is used, it is presented to the student with all of the pegs in place, constituting in effect a three-dimensional manipulatable version of a slightly modified periodic chart. This the student operates, with the aid of a supplementary manual of procedure. He first removes one by one the pegs of the first eighteen elements, in the following manner, proceeding from left to right to the end of each period:

1. H—HE
2. Li—Be—B—C—N—O—F—Ne
3. Na—Mg—Al—Si—P—S—Cl—A

He then replaces the pegs in their correct positions, with the aid of a table in the manual which shows the symbols of the elements arranged in the same pattern as the symbols on the pegboard. Associated with each symbol in the table is its period-group-number, abbreviated pgn. This is a number of two digits, the first digit being the number in front of the period in which the element occurs, and the second being the number that heads the group in which it is contained. Thus, the pgn of the element Mg is 32. Its place is in period 3, group 2. The pgn thus affords easy location of any peg in much the same manner as one locates a town on a map at the intersection of a particular latitude and meridian line by associating a letter and number in the margin of the map which identifies the lines.

By repeated removal and replacement of the pegs it finally becomes unnecessary for the student to refer to the table, for he has memorized the positions of the first eighteen elements and noted that there is no duplication of the pgn, which means that there in only one element to each group, this therefore, being considered an *a* element.

The student then continues with the long periods 4 to 6, inclusive, removing the pegs, and replacing them with the aid of the table, repeatedly until their positions are thoroughly memorized. He has noted that some of the pg numbers are duplicated, and some triplicated, thus indicating *a* and *b* elements in certain groups, and triads constituting the iron-platinum sub-group under group 8, these being regarded as *a* elements, and the noble gases as *b* elements in this group.

This instructor presents the elements in the order of their progressive increase in atomic number, and with two or three exceptions, in progressive increase in their atomic weights, and the manual which aids him in correctly replacing the pegs contains tables which list the atomic numbers and the atomic weights, but with no other information, in the positions occupied by the corresponding pegs when in proper place on the pegboard. By referring to these tables, the student becomes able from memory to associate the atomic number and the approximate atomic weight with the symbol of the element on the peg.

The actinide and lanthanide earth metals, the pegs representing which are placed horizontally across the bottom of the pegboard, are not listed according to a pgn, but rather in accordance with the letters *a* or *l* designating the row to which the element belongs, its atomic weight or number indicating its place in the row.

Having learned from memory the positions of the elements, their symbols, pg numbers, atomic numbers, atomic weights, and the progression trends, not only of the alkaline and acid properties of the elements in the periods, but other progressively varying properties such as densities, boiling points, melting points, and critical temperatures, the student may now consider the vertical columns or groups, in which the elements are classified as families in view of their analogous behaviour. The student removes and replaces the pegs of each group, referring to a table in the manual in which the families are listed in a manner such as this, for example:

1*a*—the alkali family.
2*a*—the alkaline earth family.
3*a*—the earth family.
1*b*—the silver family, etc.

The student continues this drill until the names of the families, their members and their analogous properties have been perpetuated in his memory.

There are many more analogies and progressions among the elements that can be comprehended by the student through drills of this nature, built about the manipulation of the element instructor, by the aid of which the student learns, not only with the senses of sight and hearing, as he would with a two-dimensional chart, but also with the more massive senses of touching and holding, and it is of course, well known that the more senses that are employed in acquiring an item of knowledge, the more readily will that knowledge be comprehended and retained.

While I have in the above description disclosed a practical embodiment of the invention, it will be understood by those skilled in the art that the details of construction and arrangement of parts, as shown, are by way of example and not to be regarded as necessarily restricting the scope of the invention.

What I claim is:

Educational device comprising a three-dimensional chart of the periodic table, designed as a mnemonic assist to learning the positional relationships of the elements in said table, and the significance of the order of said elements in the periods and groups with respect to atomic weights and other properties, said chart comprising a peg board having holes therein, and removable pegs, one for each known element, seated in said holes, each peg bearing the symbol of the element that it represents, the pegs being arranged in periods in the ascending order of the atomic numbers of the elements, said holes, with the pegs seated therein being arranged in horizontal rows and vertical columns representing respectively the periods and groups, the pegs identifying the holes as to the elements that they respectively repersent, so that by repeated removal and reinsertion of the pegs, the element represented by any hole in the pattern of vacated holes will be readily recollected, the pattern of holes being arranged in three blocks horizontally disposed, comprising two similar blocks in extreme positions respectively for the *a* and *b* elements repeating the first seven groups, and an intermediate block relatively widely spaced from the extremely positioned blocks, representing the positions of the iron platinum triads, the rows of said intermediate block being alined with the fourth, fifth and sixth period rows of said extremely positioned blocks.

References Cited in the file of this patent

UNITED STATES PATENTS

| | | |
|---|---|---|
| 281,770 | Lamberet | July 24, 1883 |
| 1,520,666 | Dietz | Dec. 23, 1924 |
| 2,492,563 | Flickinger | Dec. 27, 1949 |
| 2,703,459 | Paquette | Mar. 8, 1955 |
| 2,845,722 | Midgley | Aug. 5, 1958 |